United States Patent
Soni et al.

(10) Patent No.: US 10,868,829 B2
(45) Date of Patent: Dec. 15, 2020

(54) PREDICTED NETWORK TRAFFIC

(71) Applicants: Tarun Soni, Carlsbad, CA (US); Nipun Ramakrishnan, Berkeley, CA (US)

(72) Inventors: Tarun Soni, Carlsbad, CA (US); Nipun Ramakrishnan, Berkeley, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 184 days.

(21) Appl. No.: 16/156,866

(22) Filed: Oct. 10, 2018

(65) Prior Publication Data

US 2020/0120131 A1 Apr. 16, 2020

(51) Int. Cl.
| | |
|---|---|
| *H04L 29/06* | (2006.01) |
| *G06N 20/00* | (2019.01) |
| *H04L 12/24* | (2006.01) |
| *H04L 12/801* | (2013.01) |

(52) U.S. Cl.
CPC ......... *H04L 63/1458* (2013.01); *G06N 20/00* (2019.01); *H04L 41/0896* (2013.01); *H04L 41/147* (2013.01); *H04L 47/12* (2013.01); *H04L 63/1425* (2013.01)

(58) Field of Classification Search
CPC ............. H04L 63/1458; H04L 63/1425; H04L 41/0896; H04L 41/147; H04L 41/14; H04L 47/12; H04L 43/0876; H04L 43/022; G06N 20/00
See application file for complete search history.

(56) References Cited

U.S. PATENT DOCUMENTS

| | | | |
|---|---|---|---|
| 9,860,268 B2 | 1/2018 | Ahmed et al. | |
| 2017/0339022 A1 | 11/2017 | Hegde et al. | |
| 2018/0063168 A1 | 3/2018 | Sofka | |
| 2018/0137412 A1* | 5/2018 | Nikkhah | G06N 3/084 |
| 2019/0297108 A1* | 9/2019 | Johnston | H04L 63/1425 |
| 2019/0379605 A1* | 12/2019 | Pfister | H04L 47/125 |
| 2020/0104174 A1* | 4/2020 | Vlcek | G06F 9/5011 |

OTHER PUBLICATIONS

Chung, et al.: "Empirical Evaluation of Gated Recurrent Neural Networks on Sequence Modeling"; found on Oct. 10, 2018 on the internet at: http://data-science.wiki/images/Empirical_evaluation_of_gated_recurrent_neural_networks_on_sequence_modeling_1412.3555v1.pdf.
Gelenbe, et al.: "Self-Aware Networks and QoS"; Proceedings of the IEEE, vol. 92, No. 9, Sep. 2004, pp. 1478-1489.

* cited by examiner

*Primary Examiner* — Nelson S. Giddins
(74) *Attorney, Agent, or Firm* — Tarolli, Sundheim, Covell & Tummino LLP

(57) ABSTRACT

A system can include a recurrent neural network operating on one or more computing devices that generates a model that outputs a predicted network traffic for a network infrastructure based on a sample of network traffic of the network infrastructure. The predicted network traffic characterizes a predicted traffic volume and a predicted packet type and distribution in the predicted network traffic. The system can also include a network manager operating on one or more computing devices that commands a network router logically coupled to a point of ingress of the network infrastructure to adjust bandwidth limits controlled by the network router based on the predicted network traffic of the network infrastructure.

20 Claims, 9 Drawing Sheets

PREDICTED NETWORK TRAFFIC

TECHNICAL FIELD

The present disclosure relates to computer networks. More particularly, this application relates to predicting network traffic of a computer network.

BACKGROUND

A recurrent neural network (RNN) is a class of artificial neural network where connections between nodes form a directed graph along a sequence. This allows the RNN to exhibit temporal dynamic behavior for a time sequence. Unlike feedforward neural networks, RNNs can use an internal state (memory) to process sequences of inputs.

Long short-term memory (LSTM) units can be implemented as neurons in some examples of RNNs. An RNN composed of LSTM units is often called an LSTM network. A common LSTM unit is composed of a cell, an input gate, an output gate and a forget gate. The cell remembers values over arbitrary time intervals and the three gates regulate the flow of information into and out of the cell. LSTM networks are well-suited to classifying, processing and making predictions based on time series data, since there can be lags of unknown duration between important events in a time series.

Gated recurrent units (GRUs) are a gating mechanism that can be implemented as neurons in some examples of RNNs. RNNs that employ GRUs are sometimes referred to as GRU networks. GRUs are similar to LSTM units, but in contrast to LSTM units, GRUs omit an output gate.

SUMMARY

One example relates to a system that can include a recurrent neural network operating on one or more computing devices that generates a model that outputs a predicted network traffic for a network infrastructure based on a sample of network traffic of the network infrastructure. The predicted network traffic characterizes a predicted traffic volume and a predicted packet type and distribution in the network infrastructure. The system can also include a network manager operating on one or more computing devices that commands a network router logically coupled to a point of ingress of the network infrastructure to adjust bandwidth limits controlled by the network router based on the predicted network traffic of the network infrastructure.

Another example relates to a non-transitory machine-readable medium having machine readable instructions. The machine-readable instructions can include a recurrent neural network (RNN) that generates a model based on sample data corresponding to captured network traffic of a network infrastructure, and the model outputs a predicted network traffic for the network infrastructure. The predicted network traffic characterizes a predicted traffic volume and a predicted packet type and distribution in the network infrastructure. Moreover, the RNN provides the predicted network traffic to a network manager operating on one or more computing devices, wherein the network manager commands a network router logically coupled to a point of ingress of the network infrastructure to adjust bandwidth limits controlled by the network router based on the predicted network traffic of the network infrastructure.

Yet another example relates to a method for controlling operations of a network. The method can include capturing, by a packet sniffer, network traffic flowing in a network infrastructure to generate sample data that includes non-linearities. The method can also include generating, by a recurrent neural network (RNN), predicted network traffic based on the sample data, wherein the predicted network traffic characterizes the non-linearities included in the sample data. The method can further include providing the predicted network traffic to a network manager.

DETAILED DESCRIPTION

Figure 1:
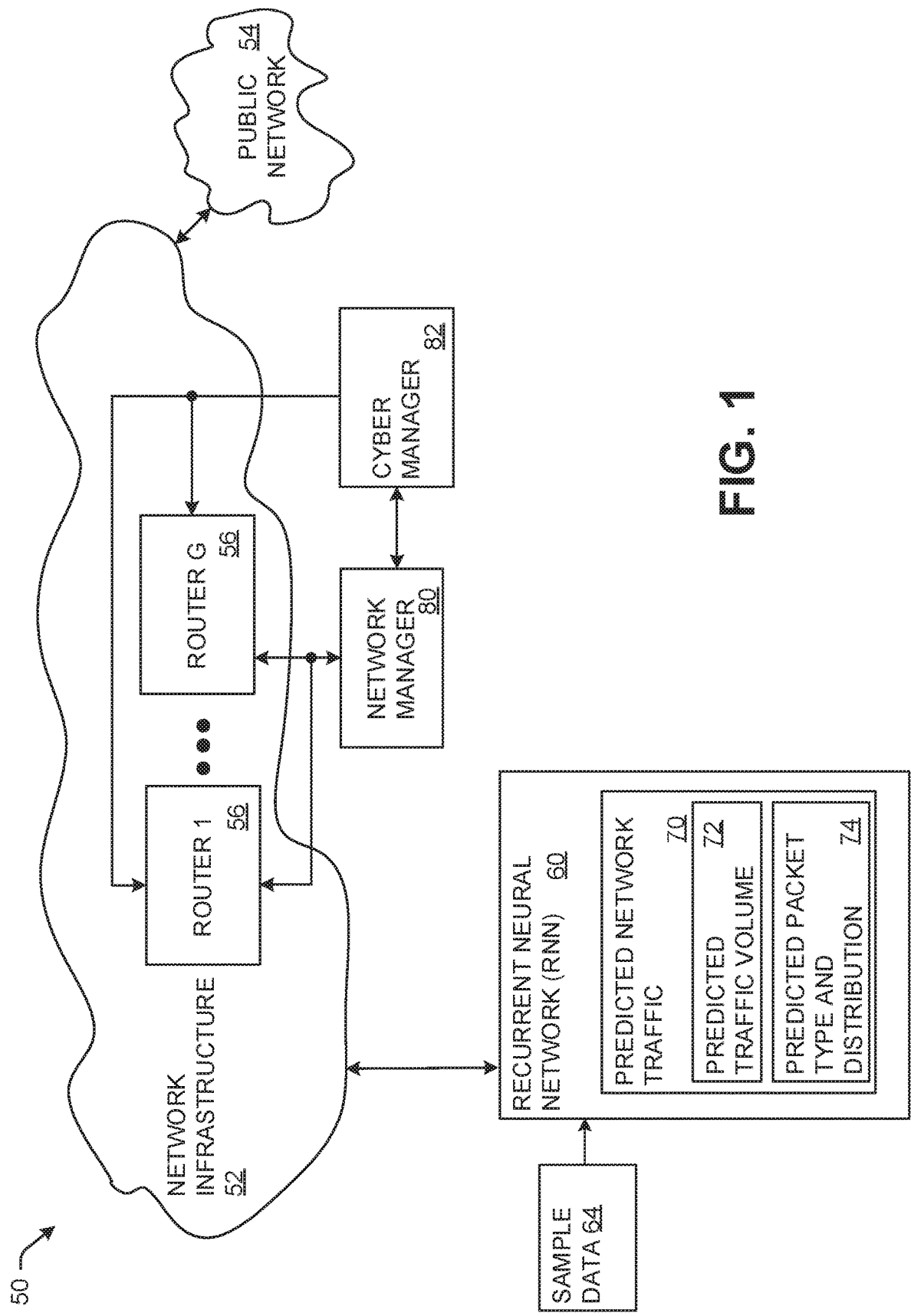
FIG. 1 illustrates an example of a system for predicting network traffic of a computer network to control operations of the computer network.

This disclosure relates to a system for employing a recurrent neural network (RNN) to predict network traffic volume of a network infrastructure (a computer network) to control operations of the network infrastructure. The system can employ captured (recorded) network traffic as input for the RNN to generate a model to simulate the flow of packets between two or more nodes in the network infrastructure. The model can be used to predict expected network traffic volume in the future that varies as a function of time. The RNN can be programmed to employ neurons that can consider both short-term and long-term trends of network traffic to improve the accuracy of the model.

As noted, the model generated by the RNN can be employed to predict a time varying network traffic volume in the future. In some examples, the RNN can be a standard RNN. In other examples, the RNN employs long short-term memory (LSTM) units as neurons to generate the model. In still other examples, the RNN employs gated recurrent units (GRUs) as neurons to generate the model. In each such examples, training data representing a sample of network traffic captured over a given time period (e.g., one hour to one week) can be input into the RNN to generate the model. Additionally, in each example, the RNN is configured such that outputs from layers of the RNN are cycled back through the RNN to allow an encoding of data dependencies in the RNN. This cycling back of outputs from layers of the RNN improves the accuracy of the model due to the inherent non-linear nature of network traffic.

The predicted network traffic can characterize a predicted traffic volume (e.g., packets per second and/or bytes per second). Additionally, in some examples, the model generated by the RNN can predict packet type and distribution of particular packets types (e.g., protocols) flowing through the network infrastructure. As one example, the model can predict that at a given window of time, 60% of the network traffic volume is going to be generated from packets in a first protocol (e.g., HTTP), 30% of the network traffic volume is going to be generated from packets in a second protocol (e.g. TCP) and 10% of the network traffic volume is going to be generated from packets that have been encrypted (with an unknown protocol).

The predicted network traffic can be leveraged in several ways. In one example, the predicted traffic volume can be employed to set bandwidth limits on network segments. For example, if a given node of the network is predicted to experience a surge (e.g., significant increase) in network traffic for a specific time period, the system can be configured to command a network router to increase the bandwidth limit for the given node prior to the predicted surge in network traffic. Accordingly, the system can be employed to efficiently allocate bandwidth to improve the overall performance of the network.

Additionally, in some examples, the system can monitor actual network traffic volume to compare the predicted network traffic with the actual (monitored) network traffic. The system can detect an anomaly where there is a significant variance between the predicted packet type and distribution and the monitored packet type distribution. Such anomalies are often indicative of cyberattacks, such as denial of service (DoS) attacks. Accordingly, upon detecting an anomaly, the system can be programmed to adjust an amount of network bandwidth reserved for reconfiguring parameters of network routers to thwart the DoS attack. In this manner, the DDoS attack is prevented from hindering the reconfiguring of the network router.

FIG. 1 illustrates an example of a system 50 for predicting network traffic of a computer network to control operations of the computer network. The computer network includes a network infrastructure 52. The network infrastructure 52 can be representative of a subnet of nodes exposed to a public network 54 (e.g., the Internet). The nodes of the network infrastructure 52 can include G number of routers 56, where G is an integer greater than or equal to one. The G number of routers 56 can control a flow of network packets through the network infrastructure 52. The G number of routers 56 can be logically connected to points of ingress and egress of the network infrastructure. Accordingly, some (or all) of the G number of routers 56 can be implemented as a firewall that establishes a barrier between the network infrastructure 52 and the public network 54.

A recurrent neural network (RNN) 60 can monitor network communications of the network infrastructure 52 and generate predicted network traffic 70 for the network infrastructure 52 in a manner described herein. The RNN 60 can be representative of software (e.g., machine readable instructions) executing on a computing platform (e.g., a server). In some examples, the RNN 60 can be a standard RNN. In other examples, the RNN 60 can be a Long Short-Term Memory (LSTM) RNN that includes LSTM units. In other examples, the RNN 60 can be Gated Recurrent Unit (GRU) RNN that includes GRUs.

The system 50 can include a packet sniffer (not shown) that can intercept and log traffic that passes over the nodes of the network infrastructure. In particular, as packets flow across the network infrastructure 52, the packet sniffer can capture each packet. In some examples, the packet sniffer can be configured/programmed to capture each packet flowing in the network infrastructure 52 of some subset thereof. In other examples, the packet sniffer can be configured/programmed to capture packets at specific nodes, such as points of ingress and/or egress of the network infrastructure.

The captured packets can be stored in a non-transitory machine medium as sample data 64 for the RNN 60. The sample data 64 can include a portion for training data and a portion for test data can represent network traffic of the network infrastructure 52 captured for a period of time (e.g., 1 hour to 1 week).

The RNN 60 can be implemented as a class of artificial neural network where connections between nodes form a directed graph along a sequence. The RNN 60 can employ the sample data 64 to generate a model that can simulate the packet flow in the network infrastructure 52. More particularly, the RNN 60 can employ the training data of the sample data 64 to train the model and the test data of the sample data 64 to test the model.

The model generated by the RNN 60 can be employed to simulate (predict) operation of the network infrastructure over a period of time in the future based on the training data (captured from actual network traffic of the network infrastructure 52). The model can generate predicted network traffic 70, which can be implemented as data that characterizes the flow of network traffic in the network infrastructure 52 that varies as a function of time. The predicted network traffic 70 can include a predicted traffic volume 72 that includes data characterizing a rate of network packets and a rate of bytes flowing through the network infrastructure 52 as a function of time (e.g., packets per second and bytes per second). As used herein, the term "traffic volume" defines a rate of network traffic flowing through a computer network.

The predicted network traffic 70 can also include a predicted packet type and distribution 74. The predicted packet type and distribution 74 can identify a (predicted) percentage of the overall network traffic in the network infrastructure 52 that a particular type of network packet (e.g., based on a network protocol) makes up. As a simplified example, in a search engine, over a given time window (e.g., 5 seconds), the percentage of network packets employing the hypertext transfer protocol (HTTP) for accessing a web server on the network infrastructure 52 may be about 90% of the total network traffic. In that same example, the percentage of network packets employing the File Transfer Protocol (FTP) could be about 4% of the total network traffic and the remaining 6% of the network traffic can be formed of a mix of other protocols.

Generation of the predicted network traffic 70 relies heavily on the statistical nature of the sample data 64 and the notion that network data is chronologically dependent. Some statistical characteristics that make prediction of network traffic (the predicted network traffic 70) particularly difficult is self-similarity and its highly nonlinear nature. To account for the non-linear nature of the network traffic, the RNN 60 includes layers (e.g., hidden layers) without that cycle back into the RNN 60. This "recycling" of outputs of layers given the RNN 60 the ability to encode a notion of dependency among data in the training data of the sample data 64. Moreover, the predicted network traffic 70 can be updated periodically and/or asynchronously. Thus, the predicted network traffic 70 can evolve as the operations of the network infrastructure 52 evolve as well.

The predicted network traffic 70 is relatively accurate. Thus, the predicted network traffic 70 can be leveraged to facilitate control of the G number of routers 56 in the network infrastructure 52. More particularly, the predicted network traffic 70 can be provided to a network manager 80 to determine if the predicted network traffic 70 indicates that adjustments to the network infrastructure 52 are needed. The network manager 80 can be representative of a computing platform (e.g., a hardware device or software operating on a server) that can monitor network traffic flowing through the network infrastructure 52. Moreover, the network manager 80 can be configured to command operations on the G number of routers 56. More particularly, the commands from the network manager 80 can set parameters of the G number of routers 56 to allocate bandwidth and/or allocate network resources to change the flow of packets through the network infrastructure 52.

As one example, the network manager 80 can examine the predicted traffic volume 72 of the predicted network traffic 70 to determine whether bandwidth should be adjusted amongst the nodes of the network infrastructure 52 for a given time period. For instance, in a situation where the predicted traffic volume 72 of the predicted network traffic 70 predicts a surge of network traffic at a particular time, the network manager 80 can command the G number of routers 56 to allocate additional bandwidth and/or other network resources to a subset of the nodes of the network infrastructure 52 to account for the increased traffic prior (e.g., 3-15 minutes before) to the predicted surge. In this manner, rather than reacting to a surge in network traffic after the surge has commenced, the network manager 80 operates proactively, and avoids network congestion.

The network manager 80 can also monitor the predicted network traffic 70 to determine if the type and distribution of packets is expected. More particularly, the network manager 80 can compare the predicted packet type and distribution 74 of the predicted network traffic 70 to an actual (monitored) packet type and distribution of packets flowing through the network infrastructure 52. For instance, if the predicted packet type and distribution 74 predicts that about 10% of the packets flowing through the network infrastructure 52 are going to be Internet Control Message Protocol (ICMP) packets, but 24% of the (actual) packets flowing in the network infrastructure 52 are ICMP packets, the network manager 80 may determine that the network infrastructure is likely facing a DoS attack, such as a distributed DoS attack (a DDoS attack). In such a situation, the network manager 80 can allocate dedicated bandwidth for a cyber-manager 82 to reconfigure the G number of routers 56 and notify the cyber-manager 82 of the possible DoS attack. In this manner, the DoS attack is prevented from hindering the reconfiguration of the G number of routers 56 during the DoS attack.

The cyber-manager 82 can be representative of a computing platform (e.g., software operating on a server) with a portion of bandwidth dedicated to reconfiguring the G number of routers 56. In some examples, the cyber-manager 82 can be operated by an end-user (e.g., a network administrator). Upon allocation of the bandwidth, the cyber-manager 82 can be employed to reconfigure the G number of routers 56 (or some subset thereof) to thwart the DoS attack. For example, the cyber-manager 82 can be employed to configure a router 56 of the G number of routers 56 to block packets of a particular type at a point ingress to the network infrastructure 52.

By employing the system 50, the RNN 60 can generate relatively accurate predicted network traffic 70 flowing through the network infrastructure. Moreover, the predicted network traffic 70 can be leveraged to improve the performance of the network infrastructure 52. In particular, the predicted network traffic 70 can be employed to reallocate bandwidth and network resources to account for continuing changes identified in the predicted network traffic 70 before the changes in the actual network traffic occur. In this manner, the network manager 80 can be proactive (instead of reactive) to changes in the network traffic on the network infrastructure 52. Furthermore, as noted, the network manager 80 can employ the predicted network traffic to identify a potential DoS attack, and take corrective action (allocate bandwidth to the cyber-manager 82) to thwart the DoS attack.

Figure 2:
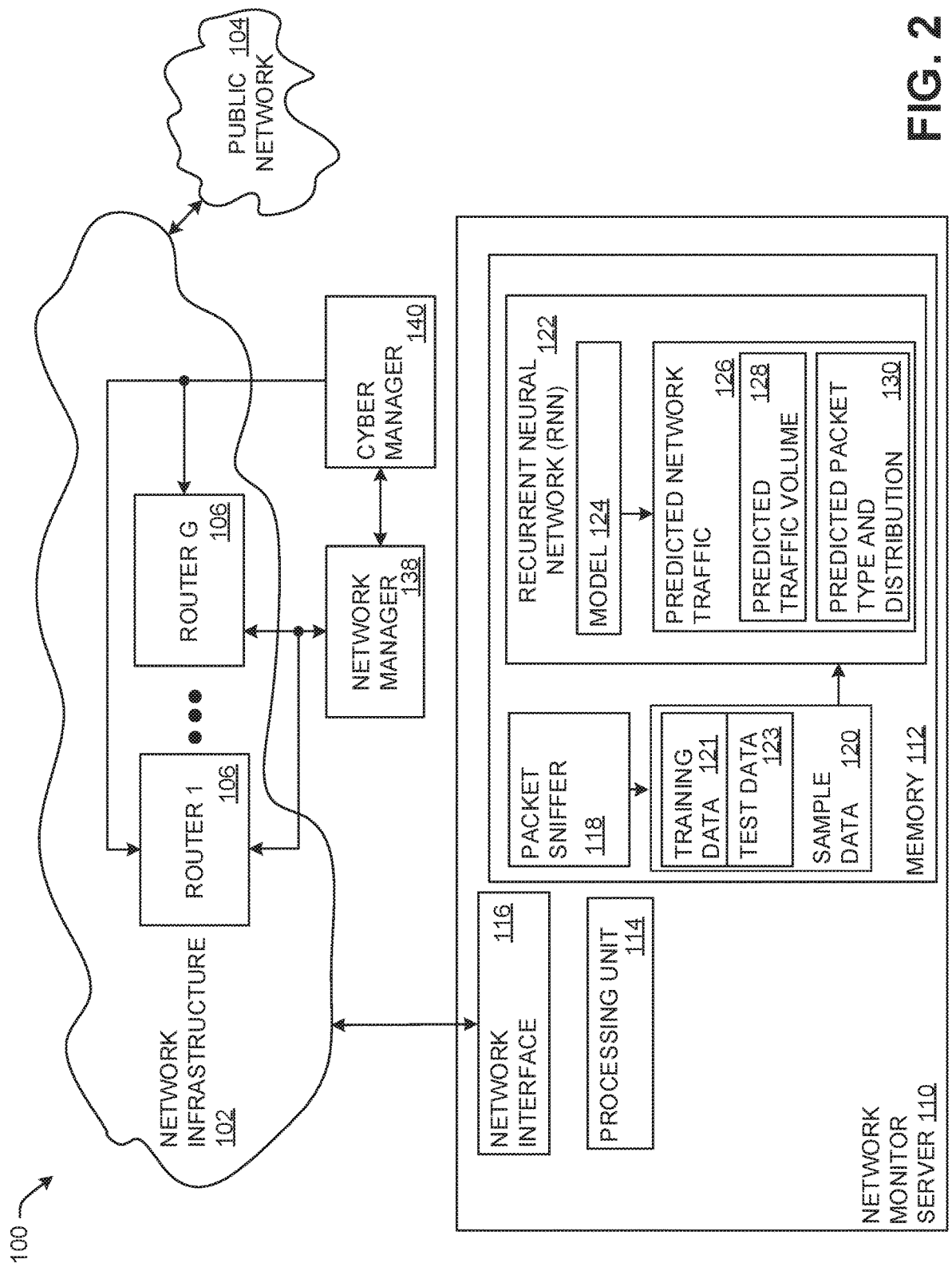
FIG. 2 illustrates another example of a system for predicting network traffic of a computer network to control operations of the computer network.

FIG. 2 illustrates an example of a system 100 for predicting network traffic of a computer network. The computer network includes a network infrastructure 102. The network infrastructure 102 can be representative of a subnet of nodes exposed to a public network 104 (e.g., the Internet). The nodes of the network infrastructure 102 can include G number of routers 106, where G is an integer greater than or equal to one.

The G number of routers 106 can control a flow of network packets through the network infrastructure 102. As some examples, the nodes of the network infrastructure 102 can include, but are not limited to servers, end-user devices (e.g., workstations, mobile devices, tablet computing devices, etc.). The G number of routers 106 can be logically connected to points of ingress and egress of the network infrastructure 102. Accordingly, some (or all) of the G number of routers 106 can be implemented as a firewall that establishes a barrier between the network infrastructure 102 and the public network 104.

A network monitor server 110 can be logically connected to the network infrastructure 102. The network monitor server 110 can monitor network communications of the network infrastructure 102 and generate a prediction of the network traffic for the network infrastructure 102 for a time in the future in a manner described herein. The network monitor server 110 can be implemented as a node of the network infrastructure 102 or the network monitor server 110 can be external to the network infrastructure 102.

The network monitor server 110 can be implemented as a computer platform (e.g., a general-purpose computing device). The network monitor server 110 can include a memory 112 that can store machine readable instructions. The memory 112 could be implemented, for example, as non-transitory machine readable medium, such as volatile memory (e.g., random access memory), nonvolatile memory (e.g., a hard disk drive, a solid-state drive, flash memory, etc.) or a combination thereof. The network monitor server 112 can also include a processing unit 114 to access the memory 112 and execute the machine-readable instructions. The processing unit 114 can include, for example, one or more processor cores. The network monitor server 110 includes a network interface 116 (e.g., a network interface card) that can access the network infrastructure 102. The network monitor server 110 could be implemented in a computing cloud. In such a situation, features of the network monitor server 110, such as the network interface 116, the processing unit 114 and the memory 112 could be representative of a single instance of hardware or multiple instances of hardware with applications executing across the multiple of instances (i.e., distributed) of hardware (e.g., computers, routers, memory, processors, or a combination thereof). Alternatively, the network monitor server 110 could be implemented on a single dedicated server.

The memory 112 of the network monitor server 110 can include a packet sniffer 118 that can intercept and log traffic that passes over the nodes of the network infrastructure 102. In particular, as packets flow across the network infrastructure 102, the packet sniffer 118 can capture each packet, or some subset thereof. In some examples, the packet sniffer 118 can be configured/programmed to capture each packet flowing in the network infrastructure 102. In other examples, the packet sniffer 118 can be configured/programmed to capture packets at specific nodes, such as points of ingress and/or egress of the network infrastructure 102. Additionally, in some examples, the packet sniffer 118 can execute on a computing device that is external to the network monitor server 110.

The captured packets can be stored as sample data 120 (a dataset) in the memory 112. The sample data 112 can be employed by a recurrent neural network (RNN) 122 stored in the memory 112 of the network monitor server 110. The sample data 120 can represent network traffic of the network infrastructure 102 captured for a period of time (e.g., 1 hour to 1 week).

The RNN 122 can be implemented as a class of artificial neural network where connections between nodes form a directed graph along a sequence. The RNN 122 can employ the sample 120 to generate a model 124 to simulate packet flow of the network infrastructure 102. More particularly, the RNN 122 can employ a first portion of the sample data 120 as training data 121 for the model 124 and a second (remaining) portion as test data 123 (verification data) for the model 124.

The model 124 can be employed to simulate (predict) operation of the network infrastructure over a period of time in the future based on the training data 121 (captured from actual network traffic of the network infrastructure 102). The model 124 can generate predicted network traffic 126, which can be implemented as data that characterizes the flow of network traffic in the network infrastructure that varies as a function of time. The predicted network traffic 126 can include a predicted traffic volume 128 that includes data characterizing a rate of network packets and a rate of bytes flowing through the network infrastructure 102 as a function of time (e.g., packets per second and bytes per second).

The predicted network traffic 126 can also include a predicted packet type and distribution 130. The predicted packet type and distribution 130 can identify a (predicted) percentage of the overall network traffic in the network infrastructure 102 that a particular type of network packet (e.g., based on a network protocol) makes up. As a simplified example, in a video streaming system, over a given time window (e.g., 5 seconds), the percentage of network packets employing the hypertext transfer protocol (HTTP) for accessing a web server on the network infrastructure 102 may be about 20% of the total network traffic. In that same example, the percentage of network packets employing the Real-time Streaming Protocol (RTSP) could be about 70% of the total network traffic and the remaining 10% of the network traffic can be formed of a mix of other protocols.

Generation of the predicted network traffic 126 relies heavily on the statistical nature of the sample data 120 and the notion that network data is chronologically dependent. Some statistical characteristics that make prediction of network traffic particularly difficult is self-similarity and its highly nonlinear nature. To account for the non-linear nature of the network traffic, the RNN 122 includes layers (e.g., hidden layers) that cycle back into the RNN 122. This "recycling" of outputs of layers give the RNN 122 the ability to encode a notion of dependency among data in the training data 121. More particularly, to generate the model 124, the RNN 122 employs an input sequence, $x=(x_1, x_2, \ldots, x_T)$ to compute a hidden vector sequence, $h=(h_1, h_2, \ldots, h_T)$ and an output sequence, $y=(y_1, y_2, \ldots, y_T)$, where T is the number of time sequences sampled in the training data 121. Moreover, for each of the values of t=1 to T, the RNN can employ Equations 1 and 2 to computer $h_t$ and $y_t$.

$$h_t = f(W_{xh}x_t + W_{hh}h_{t-1} + b_n) \quad \text{Equation 1:}$$

$$y_t = W_{hy}h_t + b_y \quad \text{Equation 2:}$$

Wherein:
$W_{kj}$ represents a weight matrix between layer k and layer j such that:
  $W_{xh}$ is the weight of the matrix between layer x and hidden layer h;
  $W_{hh}$ is the weight of the matrix between the hidden layers, h;
  $W_{hy}$ is the weight of the matrix between the hidden layer h and the layer y
  $b_n$ and $b_y$ is the bias vector of the nth and yth layers, respectively; and
  $f$ is the activation function of the RNN, which can be the sigmoid function.

Moreover, the RNN 122 can employ the backpropagation through time algorithm to calculate gradients. However, to avoid vanishing gradients, in some examples, the RNN 122 can be implemented with Long Short-Term Memory (LSTM) unit as the neurons of the RNN 122.

Figure 3:
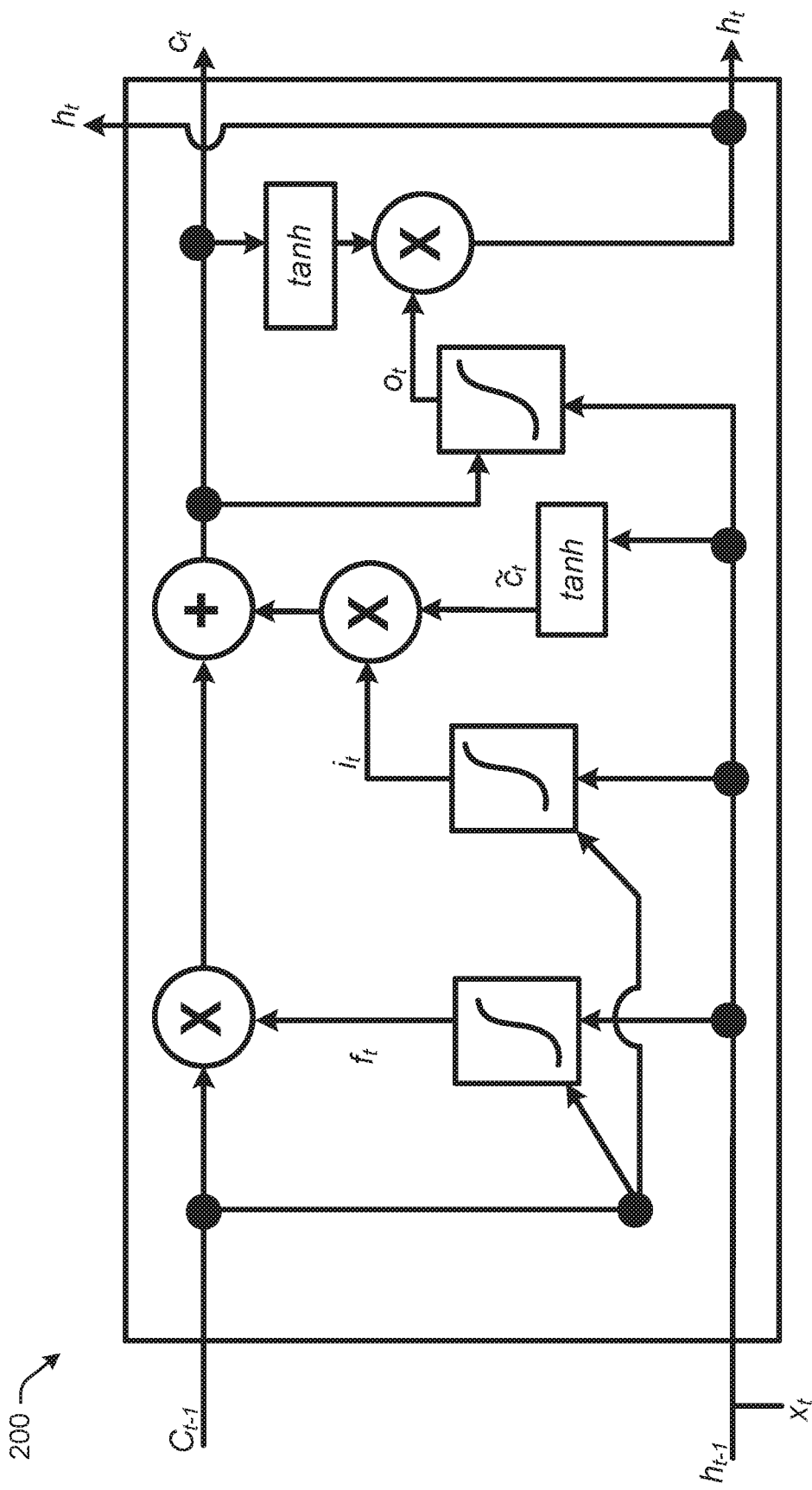
FIG. 3 illustrates an example of a long short-term memory (LSTM) unit for a recurrent neural network (RNN).

FIG. 3 illustrates an example of an LSTM unit 200 that could be employed as a neuron for the RNN 122 of FIG. 2. The LSTM unit 200 includes a memory cell, $c_t$ provides output, $h_t$. Equations 3 and 4 define the output, $h_t$ of the LSTM unit 200 based on an output gate, $o_t$.

$$h_t = o_t \tan h(c_t) \quad \text{Equation 3:}$$

$$o_t = \sigma(W_{xo}x_t + W_{ho}h_{t-1} + W_{co}c_t + b_0) \quad \text{Equation 4:}$$

Wherein:
$W_{kj}$ represents a weight matrix between layer k and layer j such that:
  $W_{xo}$ is the weight of the matrix between layer x and layer o;
  $W_{ho}$ is the weight of the matrix between the hidden layer h and layer o;
  $W_{co}$ is the weight of the matrix between the layers c and o;
  $b_0$ is the bias of the layer o; and
  $\sigma$ is the sigmoid activation function.

An RNN (e.g., the RNN 122 of FIG. 1) employing the LSTM unit 200 updates the memory content, $c_t$ by partially forgetting current memory and adding new memory, $\tilde{c}_t$ with Equations 5 and 6.

$$c_t = f_t c_t + i_t \tilde{c}_t \quad \text{Equation 5:}$$

$$\tilde{c}_t = \tan h(W_{xc}x_t + W_{hc}h_{t-1} + b_c) \quad \text{Equation 6:}$$

Wherein:
$W_{kj}$ represents a weight matrix between layer k and layer j such that:
  $W_{xc}$ is the weight of the matrix between layer x and layer c;
  $W_{hc}$ is the weight of the matrix between the hidden layer h and layer c;
  $b_c$ is the bias of the memory content layer, c
$f_t$ is the extent to which memory is forgotten, sometimes referred to as a "forget gate" and is defined by Equation 7;
$i_t$ is degree wo which new content is added to the cell, referred to as an "input gate", and is defined by Equation 8.

$$f_t = \sigma(W_{xf}x_t + W_{hf}h_{t-1} + W_{cf}c_t + b_f)$$ Equation 7:

$$i_t = \sigma(W_{xi}x_t + W_{hi}h_{t-1} + W_{ci}c_t + b_i)$$ Equation 8:

Wherein:
$W_{kj}$ represents a weight matrix between layer k and layer j such that:
- $W_{xf}$ is the weight of the matrix between layer x and layer f;
- $W_{hf}$ is the weight of the matrix between the hidden layer h and layer f;
- $W_{cf}$ is the weight of the matrix between layer c and layer f;
- $W_{xi}$ is the weight of the matrix between the layer x and layer i
- $W_{hi}$ is the weight of the matrix between the hidden layer h and layer i;
- $W_{ci}$ is the weight of the matrix between the layer c and layer i;
- $b_f$ is the bias of the forget gate; and
- $b_i$ is the bias of the input gate.

Employment of the forget gate $f_t$, and the input gate, $i_t$ allows the LSTM unit 200 to determine whether to keep existing memory or weigh new information over existing memory. In contrast, a standard RNN (that does not employ the LSTM unit 200) overwrites memory each time step. Stated differently, the LSTM unit 200 elevates the potential of capturing long-term dependencies, since the LSTM unit 200 can carry over information if the LSTM unit 200 detects an important feature in the early stage of training.

Figure 4:
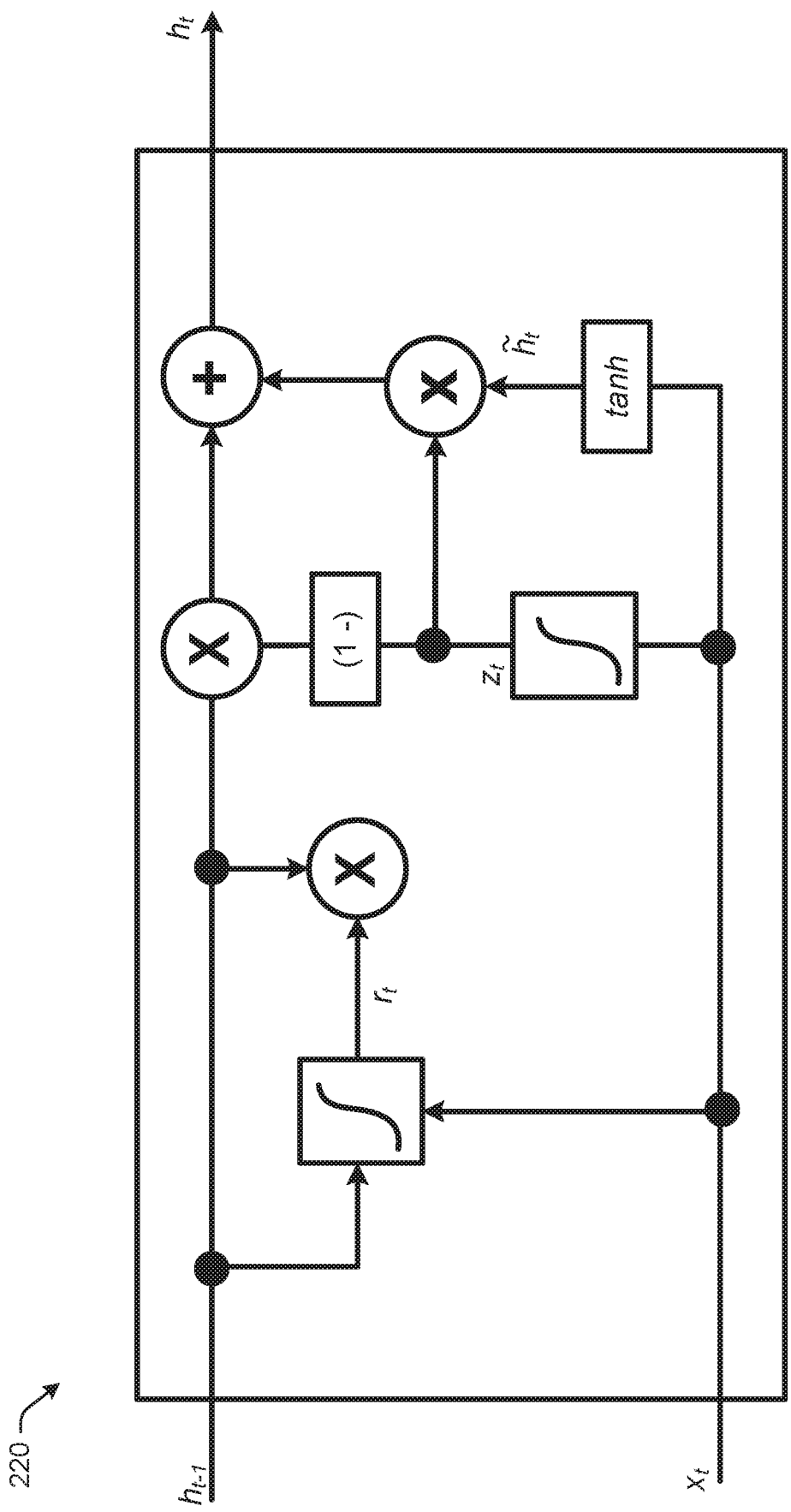
FIG. 4 illustrates an example of a gated recurrent unit (GRU) for a recurrent neural network (RNN).

Referring back to FIG. 2, in other examples, to avoid the vanishing gradients, the RNN 122 can employ Gated Recurrent Unit (GRUs) as the neurons of the RNN 122. FIG. 4 illustrates a GRU 220 that could be employed by the RNN 122 of FIG. 1. The GRU 220 has gated units that control the flow of information inside the GRU 220, but in contrast to the LSTM unit 200 of FIG. 3, the GRU 220 does not have separate memory cells.

The output, $h_t$ of the GRU 220 varies based on an update gate, $z_t$ and a candidate activation, $\tilde{h}_t$, which are be defined by Equations 9-11.

$$h_t = (1-z_t)h_{t-1} + z_t\tilde{h}_t$$ Equation 9:

$$z_t = \sigma(W_{xz}x_t + W_{hz}h_{t-1})$$ Equation 10:

$$\tilde{h}_t = \tan h(W_{x\tilde{h}}x_t + W_{h\tilde{h}}(r_t \odot h_{t-1}))$$ Equation 11:

Wherein:
$W_{kj}$ represents a weight matrix between layer k and layer j such that:
- $W_{xz}$ is the weight of the matrix between layer x and layer z;
- $W_{hz}$ is the weight of the matrix between the hidden layer h and layer z;
- $W_{x\tilde{h}}$ is the weight of the matrix between layer x and hidden layer $\tilde{h}$;
- $W_{hz}$ is the weight of the matrix between the hidden layer h and layer z;
- $\sigma$ is the sigmoid activation function;
- $r_t$ is the extent to which the GRU 220 should remember a pervious state, which can b referred to as a "reset gate" and is defined by Equation 12; and
- $\odot$ is an element wise multiplication operation of two vectors;

$$r_t = \sigma(W_{xr}x_t + W_{hr}h_{t-1})$$ Equation 12:

Wherein:
$W_{kj}$ represents a weight matrix between layer k and layer j such that:
- $W_{xr}$ is the weight of the matrix between layer x and layer r;
- $W_{hr}$ is the weight of the matrix between the hidden layer h and layer r; and
- $\sigma$ is the sigmoid activation function;

Referring back to FIG. 2, in a given example, (hereinafter, "the given example") the sample data 120 (a dataset) can represents data between two (2) virtual machines operating as nodes on the network infrastructure 102. In the given example, these virtual machines generate real-world network traffic through internal network requests in various protocols. In the given example, it is presumed that the network requests are formatted as HTTP requests, Transmission Control Protocol (TCP) requests and Internet Control Message Protocol (ICMP) requests.

In the given example, it is presumed that the training data 121 represents two (2) hours of network traffic sampled every five (5) seconds between the two (2) virtual machines. The model 124 simulates packet flow of the network infrastructure 102 such that for a time series, $((p_1, b_1), \ldots, (p_T, b_T))$ of sampled network traffic volume of packets, p and bytes, b obtained from each five (5) second window in time, the predicted traffic volume 128 of the predicted network traffic 126 generated by the model 124 predicts a time series $((p_{T+1}, b_{T+1}), \ldots, (p_{T+n}, b_{T+n}))$ for n steps into the future. To train the model 124 corresponding to the packet flow in the network infrastructure 102 with the training data 121, the RNN 122 can employ a sliding window process. The sliding window process employs packet/byte volumes at fixed previous t times steps, $(x_1, \ldots, x_t)$ as features to make a prediction for the rate of packets at the next time step, $x_{t+1}$. Accordingly, the sliding window process dictates that for N number of data points in the training data 121, there is a training data matrix having dimensions of (N−t) by t. Each data point in the training data matrix represents one sample volume of packets in a corresponding five (5) second window.

As noted, the predicted network traffic 126 can also include the packet type and distribution 130 that characterizes a percentage of packet types (protocols) within the network traffic. The model 124 can simulate the packet flow of the network infrastructure 102 such that for a packet classification, $(k_1, \ldots, k_T)$, of sampled network traffic volume of packets, the predicted packet type and distribution 130 of the predicted network traffic 126 generated by the model 124 corresponding to the network infrastructure 102 predicts a packet classification of $(k_{T+1}, \ldots, k_{T+n})$ for n steps into the future. Each k represents a possible protocol classification. In the given example, the training data 121 includes packets types (protocols) of HTTP, TCP, ICMP and the Address Resolution Protocol (ARP).

The predicted packet type and distribution 130 of the predicted network traffic 126 can be generated by feeding the classification of each packet in the training data 121 into the model 124 using the sliding window process. In a model 124 of k classes corresponding to protocols, the model 124 predicts a real number, and this real number is rounded to the nearest classification in the range of integers [0, k−1]. The accuracy of the model 124 using a standard classification accuracy metric.

Moreover, the packet distribution of the predicted packet type and distribution 130 dictates that for a set of distribution of packets $((p_1^1, \ldots, p_1^k) \ldots (p_T^1, \ldots, p_T^k))$, with k distinct protocols, where $p_t^j$ represents the distribution of protocol j at a time step, t and wherein $\Sigma_{n=1}^{k} p_t^n = 1$. Thus, the model 124 simulates packet flow of the network infrastructure 102 to predicts a packet distribution of $((p_{T+1}^1, p_{T+1}^k) \ldots (p_{T+N}^1, \ldots, p_{T+N}^k))$ for N time steps into the future. In effect, the prediction of network packet distribution is similar to a histogram prediction in which each protocol has a specific frequency that is being estimated at in future ranges of time. Thus, after obtaining sampled packet distributions included in the training data 121 for T time steps, each data point is a row in a vector of dimension k. Accordingly, the resultant matrix has dimensions of T by k. Moreover, the model 124 applies the sliding window process.

To obtain a tuned sliding window parameter, the RNN 122 evaluates the model 124 on several sliding window lengths and selects the sliding window that allows for optimized performance.

Continuing with the given example, the training data 121 characterizes 25,881 packets after sampling packets every five (5) seconds for two (2) hours and 67% of this data is employed as the training data 121 and the remaining portion can be employed as the test data 123. To quantitatively evaluate the predictions, the RNN 122 can employ a Mean Squared Error (MSE) metric characterized by Equation 13.

$$MSE(y, \hat{y}) = \frac{1}{N} \sum_{i=1}^{N} (y_i - \hat{y}_i)^2 \qquad \text{Equation 13}$$

Wherein:
y is the correct value (in the test data) and ŷ is the valued predicted by the model 124.

In Equation 13, it is presumed that the input data (the training data 121 and the test data 123) is normalized to a range between 0 and 1 by diving by the maximum value in the training data 121 and the test data 123. Moreover, in Equation 13, the closer the value is to zero ('0'), the higher the accuracy of the predicted value. Similarly, for matrix volume prediction, the MSE is averaged for each column of volume data. Table 1 demonstrates measured results for the given example.

TABLE 1

| Model | MSE (Packets/s) | MSE (Bytes/s) | MSE Distribution | Accuracy (%) |
|---|---|---|---|---|
| RNN | 0.0026 | 0.0029 | 0.0092 | 91.1 |
| LSTM | 0.0028 | 0.0023 | 0.0083 | 92.9 |
| GRU | 0.003 | 0.0022 | 0.0083 | 83.8 |

The first column of Table 1 (labeled Model) defines the type of model. The row labeled "RNN" corresponds to employment of a standard RNN as the RNN 122. The row labeled "LSTM" corresponds to employment of an RNN that employs the LSTM unit 200 of FIG. 3 as the RNN 122. Further, the row labeled "GRU" corresponds to employment of an RNN that employs the GRU 220 of FIG. 4. In Table 1, the second column (labeled "MSE Packets/s") and the third column (labeled "MSE Bytes/s") represent the MSE (Mean Squared Error) of the predicted number of packets per second (rate) and the predicted number of bytes per second (rate), respectively. Thus, the second and third columns of Table 1 can correspond to the MSE of the predicted traffic volume 128. Additionally, the fourth column (labeled "MSE Distribution") can define the MSE of the predicted packet distribution, which can correspond to packet type distribution. Similarly, the fifth column (labeled "Accuracy (%)") demonstrates the accuracy of packet classification.

Figure 5:
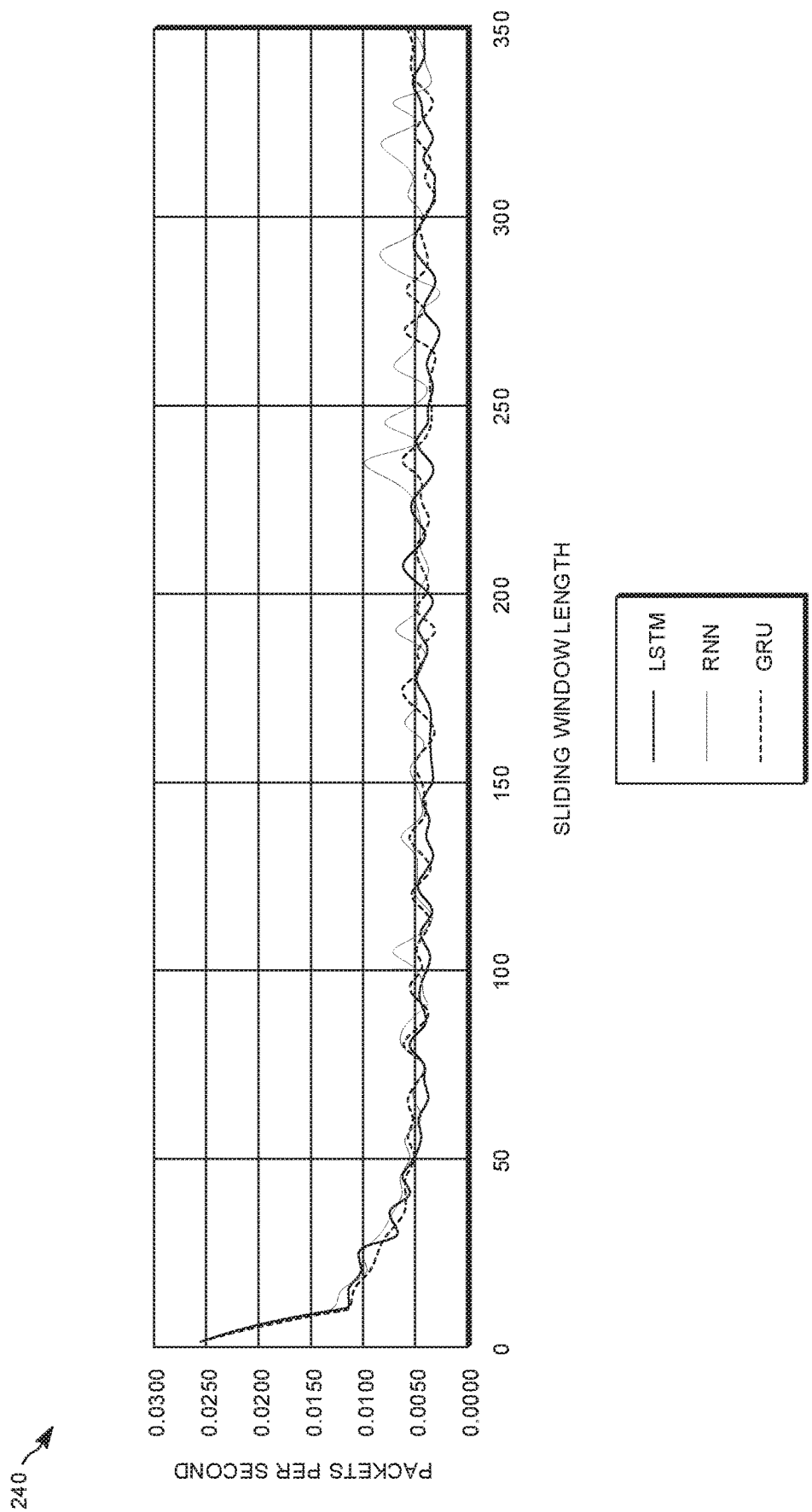
FIG. 5 illustrates a graph that plots a mean squared error (MSE) of a predicted packet volume as a function of sliding window length for an RNN.
Figure 6:
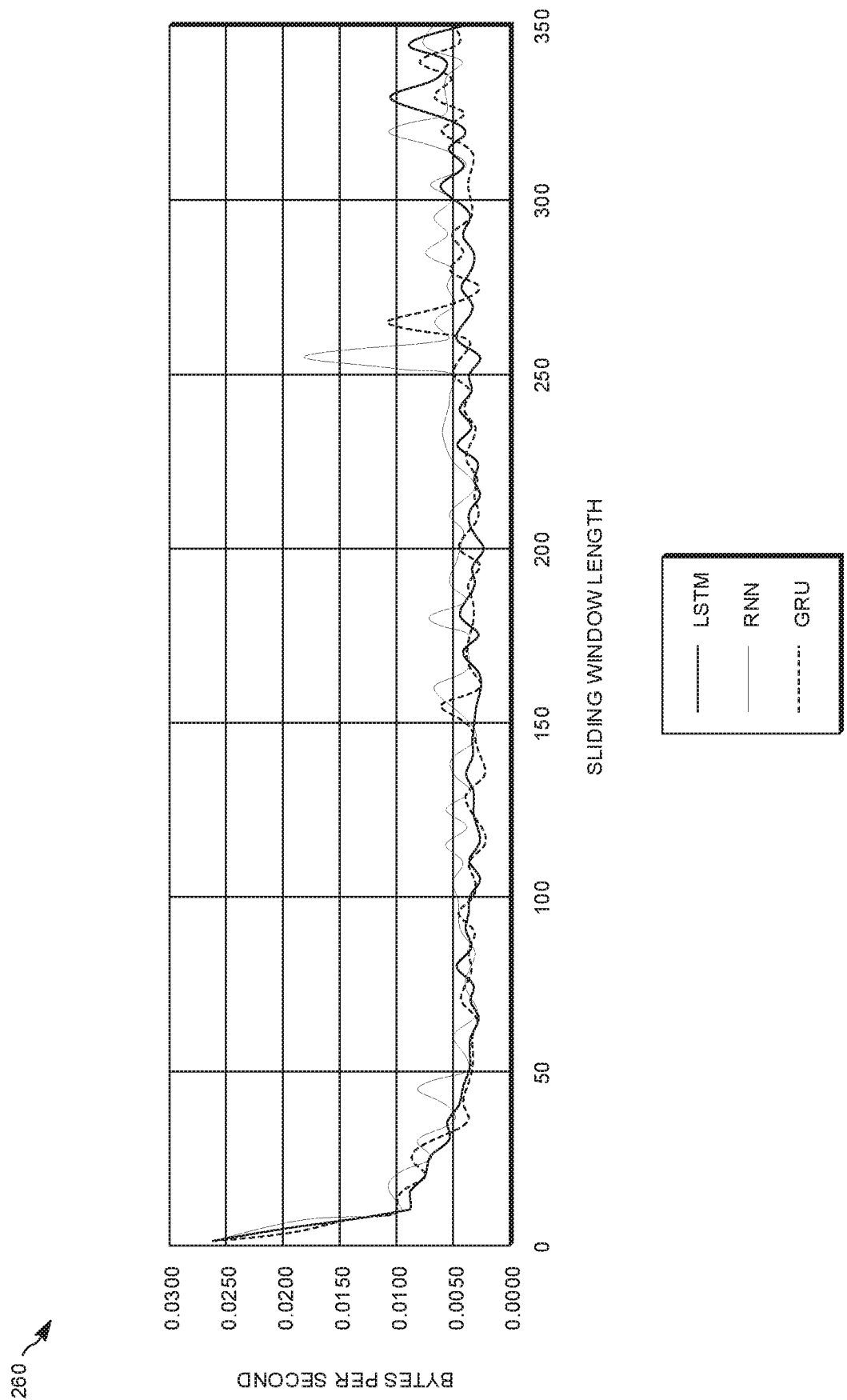
FIG. 6 illustrates a graph that plots an MSE of a predicted byte volume as a function of sliding window length for an RNN.

FIG. 5 illustrates a graph 240 that plots MSE of packet volume (packets per second) as a function of window length in the given example. FIG. 6 illustrates a graph 260 that plots MSE of byte volume (bytes per second) as a function of the window length in the given example. The RNN 122 can select the window length corresponding to the global minimum in FIGS. 5 and 6.

Figure 7:
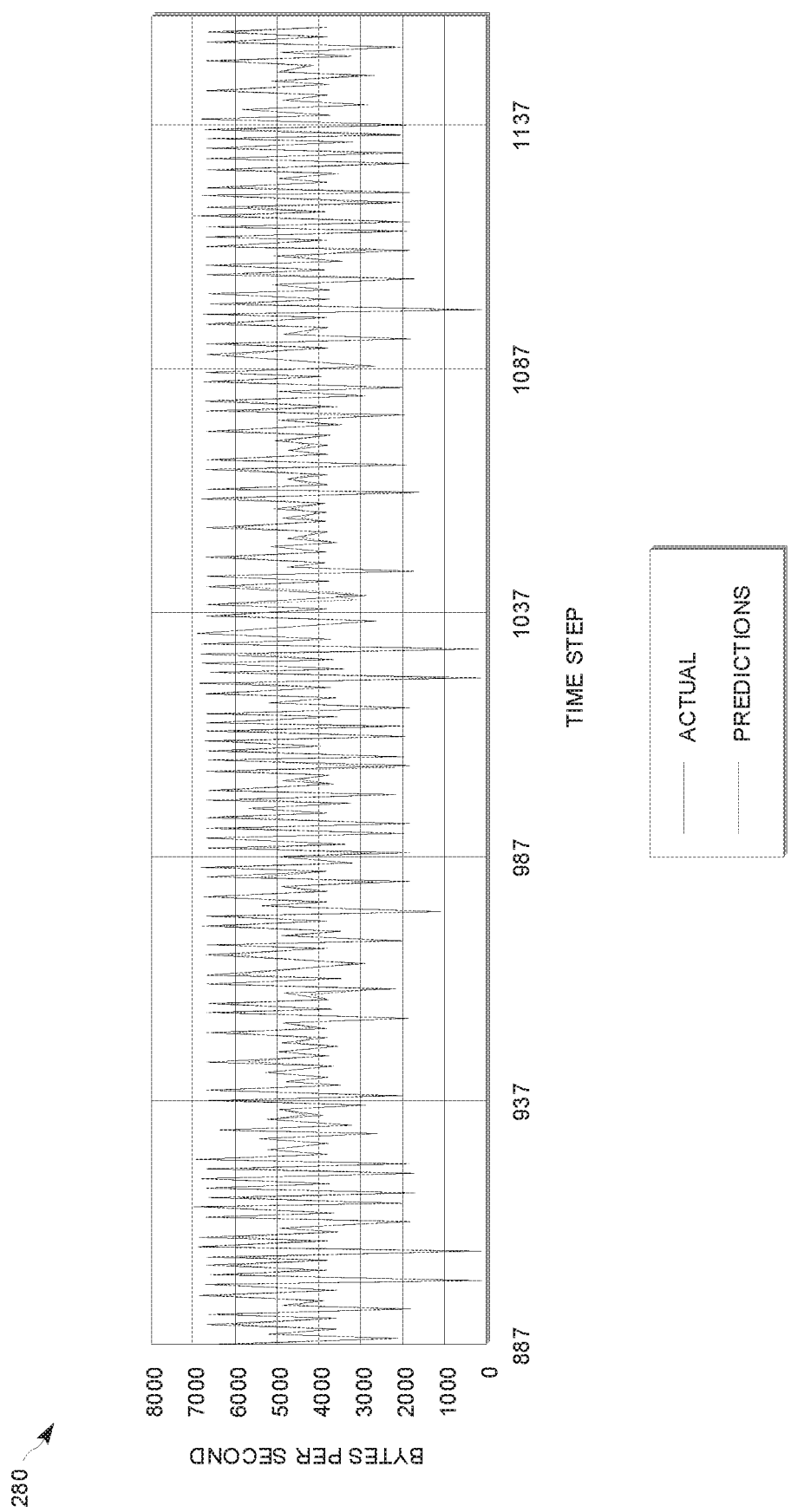
FIG. 7 illustrates a graph that plots a predicted byte volume and an actual byte volume as a function of time.

FIG. 7 illustrates a graph 280 that plots bytes per second (Bytes/s) as a function of a time step (in seconds) for an example of the RNN 122 of FIG. 2 employing the GRU 220 of FIG. 4. Similar results are achieved with a standard RNN or an RNN employing the LSTM unit 200 of FIG. 3 as the RNN 122 of FIG. 2.

Figure 8:
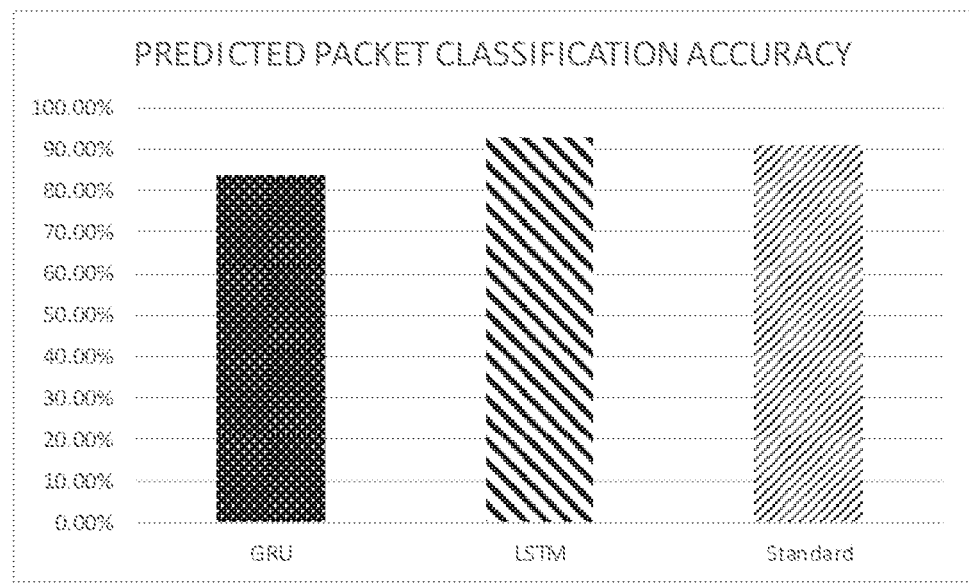
FIG. 8 illustrates a bar chart that plots a predicted packet classification accuracy for different types of RNNs.

FIG. 8 illustrates a bar chart 300 that plots an accuracy of packet classification for three different types of RNNs employed as the RNN 122 of FIG. 2 in the given example. More particularly, the bar chart 300 plots an RNN employing the GRU 220 of FIG. 4, an RNN employing the LSTM unit 200 of FIG. 3 and a standard RNN.

Figure 9:
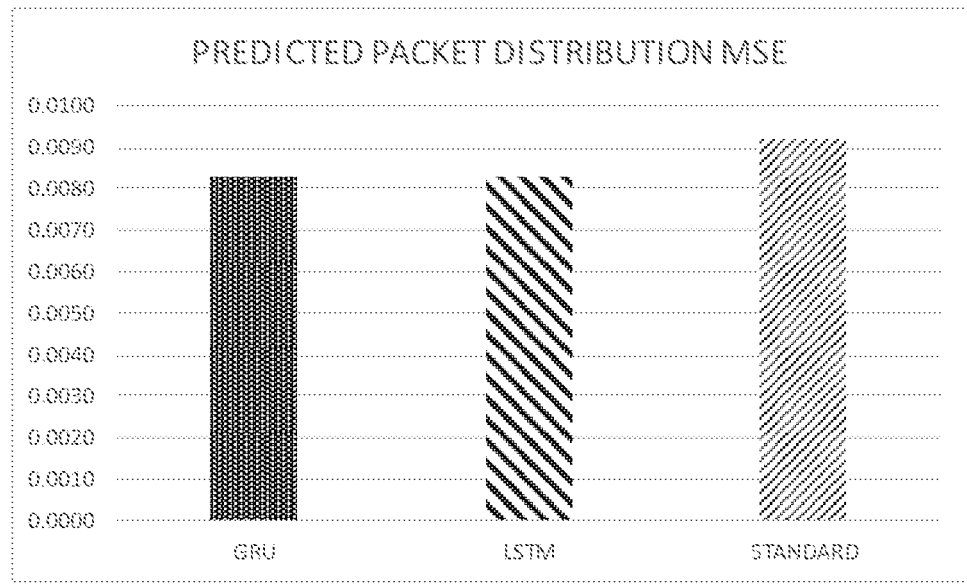
FIG. 9 illustrates a bar chart that plots a predicted packet distribution MSE for different types of RNNs.

FIG. 9 illustrates a bar chart 320 that plots an MSE of predicted packet distribution for three different types of RNNs employed as the RNN 122 of FIG. 2 in the given example. More particularly, the bar chart 320 plots an RNN employing the GRU 220 of FIG. 4, an RNN employing the LSTM unit 200 of FIG. 3 and a standard RNN.

Referring back to FIG. 2, as demonstrated, the predicted network traffic 126 is relatively accurate. Furthermore, the predicted network traffic 126 can be updated (recalculated) periodically and/or asynchronously. Thus, the predicted network traffic 126 can be leveraged to facilitate control of the G number of routers 106 in the network infrastructure 102. More particularly, the predicted network traffic 126 can be provided to a network manager 138 to determine if the predicted network traffic 126 indicates that adjustments to the network infrastructure 102 are needed. The network manager 138 can be representative of a computing platform (e.g., a hardware device or software executing on a computing device) that can monitor network traffic flowing through the network infrastructure. Moreover, the network manager 138 can be configured to command operations on the G number of routers 106. More particularly, the commands from the network manager 138 can set parameters of the G number of routers 106 to allocate bandwidth and/or allocate network resources to change the flow of packets through the network infrastructure 102.

As one example, the network manager 138 can examine the predicted traffic volume 128 of the predicted network traffic 126 to determine whether bandwidth should be adjusted amongst the nodes of the network infrastructure 102 for a period of time. For instance, in a situation where the predicted traffic volume 128 of the predicted network traffic 120 predicts a surge of network traffic at a given time period, the network manager 138 command the G number of routers 106 to allocate additional bandwidth to a subset of the nodes of the network infrastructure 102 to account for the increased traffic prior (e.g., 3 to 15 minutes before) to the predicted surge in network traffic. Moreover, when the predicted traffic volume 128 predicts that the surge in network traffic has finished, the network manager 138 can command the G number of routers to reduce the bandwidth accordingly.

As a more specific example, consider a situation where the predicted traffic volume 128 predicts a surge in packets of a particular protocol (included in the predicted packet type and distribution 130) that carry video data from a set of video service servers (a set of nodes) in the network infrastructure 102 at a given time (e.g., 2200 GMT (Greenwich Mean Time) for a video streaming service) to the public network 104 for nodes in the public network 104 associated with a given geographic region (e.g., the East Coast of the United States). In this specific example, prior to the given time, the network manager 106 can command the G number of routers 106 to allocate additional bandwidth and/or resources within the network infrastructure to 102 to route packets from the given geographic region (e.g., the East Coast) to the set of servers within the network infrastructure 102 to handle the surge in packets that carry the video data.

Moreover, continuing with the specific example, consider a situation where the predicted traffic volume 128 predicts a second surge in packets of the particular protocol (included in the predicted packet type and distribution 130) that carry video data from the set of video service servers at another time (e.g., 0100 GMT) to the public network 104 associated with another geographic region (e.g., the West Coast of the United States). In this specific example, prior to the other time, the network manager 106 can command the G number of routers 106 to allocate additional bandwidth and/or resources within the network infrastructure to 102 to route packets from the other geographic region (e.g., the West Coast) to the set of video service servers within the network infrastructure 102 to handle the second surge in packets that carry the video data.

The network manager 138 can also monitor the predicted network traffic 126 to determine if the type and distribution of packets is expected. More particularly, the network manager 138 can compare the predicted packet type and distribution 130 of the predicted network traffic 126 to an actual (monitored) packet type and distribution of packets flowing through the network infrastructure 102. For instance, if the predicted packet type and distribution 130 predicts that about 3% of the packets flowing through the network infrastructure 102 are going to be File Transfer Protocol (FTP) packets, but 10% of the (actual) packets flowing in the network infrastructure 102 are FTP packets, the network manager 138 may determine that the network infrastructure is likely facing a DoS attack, such as a DDoS attack. Stated differently the network manager 138 predicts a DoS attack in response to packets of a particular type in monitored (actual) network traffic exceeding the predicted distribution for the particular type of packet (included in the predicted packet type and distribution 130) by a threshold amount (e.g., 5%). In response to determining that a DoS attack is likely, the network manager 106 commands a router 106 (or multiple routers 106) to allocate a predetermined amount of network bandwidth (dedicated bandwidth) to a cyber-manager 140 in response to the prediction of the DoS attack.

The cyber-manager 140 can be representative of a computing platform (e.g., software operating on a server) with the predetermined bandwidth dedicated to reconfiguring the G number of routers 106. In some examples, the cyber-manager 140 can be operated by an end-user (e.g., a network administrator). In such a situation, the cyber-manager 140 can analyze packets flowing through each of the G number of routers 106 (or some subset thereof) to determine a likely point of ingress of the DoS attack. Stated differently, the cyber-manager 140 can examine packets flowing through the G number of routers 106 to identify a likely source of the DoS attack, which source may be in the public network 104. Upon identifying the likely source of the DoS attack, the cyber-manager 140 can (in response to user input), reconfigure the particular router 106 (of the G number of routers 106) that is the point of ingress of the likely source of the DoS attack to block further network traffic from the likely source of the DoS attack. In some examples, the particular router 106 can be taken offline (e.g., shutdown). In other examples, the particular router 106 can be reconfigured to close a port (e.g., the FTP port). In this manner, the DoS attack can be thwarted without shutting down a substantial portion of the network infrastructure 102. Additionally, allocating the dedicated bandwidth to the cyber-manager 140 prevents the DoS attack from hindering the reconfiguration of the G number of routers 106.

By employing the system 100, the RNN 122 can generate a relatively accurate prediction of network traffic 126 flowing through the network infrastructure 102. Moreover, this prediction of network traffic 126 can be leveraged to improve the performance of the network infrastructure 102. In particular, the predicted network traffic 126 can be employed to reallocate bandwidth and/or network resources to account for continuing changes identified in the predicted network traffic 126 before the changes in the actual network traffic occur. In this manner, the network manager 138 can be proactive (instead of reactive) to changes in the network traffic on the network infrastructure 102. Furthermore, as noted, the network manager 138 can employ the predicted network traffic to identify a likely DoS attack, and take corrective action (allocate bandwidth to the cyber-manager 140) to thwart the DoS attack.

Figure 10:
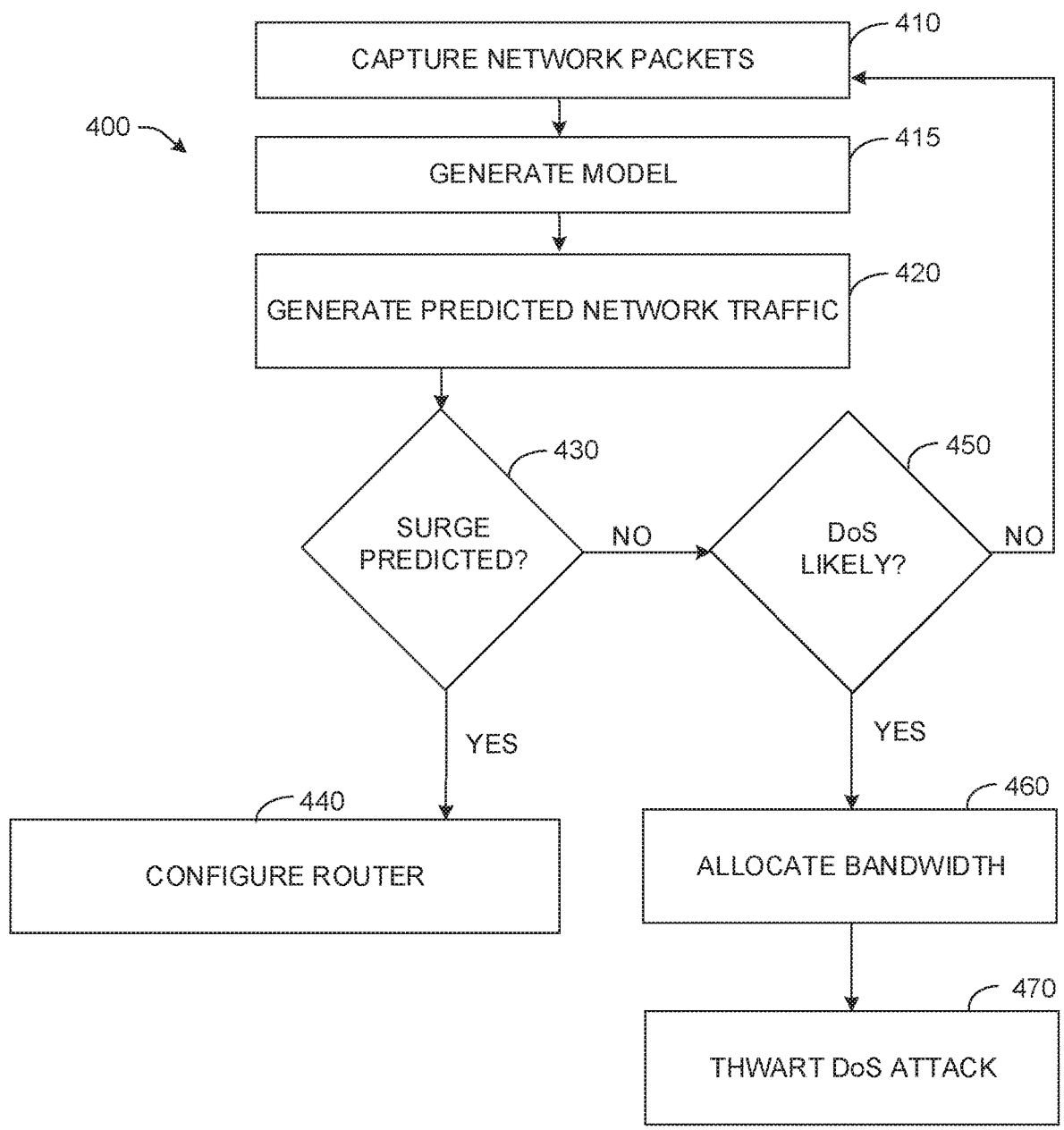
FIG. 10 illustrates a flowchart of an example method for controlling operations of a network based on predicted network traffic.

In view of the foregoing structural and functional features described above, an example method will be better appreciated with reference to FIG. 10. While, for purposes of simplicity of explanation, the example method of FIG. 10 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 10 illustrates a flow diagram of an example method 400 for controlling operations of a network infrastructure based on predicted network traffic. The method 400 can be implemented by system 50 of FIG. 1 and/or the system 100 of FIG. 2.

At 410, network packets flowing through the network infrastructure are captured by a packet sniffer (e.g., the packet sniffer 118 of FIG. 2). The captured packets are received by an RNN (e.g., the RNN 122 of FIG. 2) as sample data. In some examples, the sample data includes a plurality of non-linearities. At 415, the RNN generates a model (e.g., the model 124 of FIG. 2) that can simulate packets flowing through the network infrastructure based on the sample data. At 420, the model can generate predicted network traffic (e.g., the predicted network traffic 126 of FIG. 2) that can be leveraged to improve operation of the network infrastructure. In some examples, the predicted network traffic can account for the non-linearities in included in the sample data.

At 430, a network manager (e.g., the network manager 138 of FIG. 2) can analyze predicted traffic volume of the predicted network traffic to determine if a surge of network traffic is predicted for a time in the near future (e.g., within the next fifteen minutes). If the determination at 430 is positive (e.g., YES), the method 400 can proceed to 440. If the determination at 430 is negative (e.g., NO), the method 400 can proceed to 450. At 440, the network manager can configure a router (or multiple routers) of the network infrastructure (e.g., the G number of routers 106 of FIG. 2) to allocate bandwidth and/or network resources to handle the predicted surge. In some examples, after 440, the method can proceed to 450 (not shown). In other examples, after 440, the method 400 can return to 410 (not shown). In still other examples, after 440, the method 400 can end.

At 450, the network manager analyzes a predicted packet type and distribution of the predicted network traffic to determine if a DoS attack is likely. The determination can be made based, for example, on an observation of an unpredicted surge of network packets of a particular type (protocol) flowing through the network infrastructure 102. If the determination at 450 is negative (e.g., NO), the method 400 returns to 410. If the determination at 450 is positive (e.g., YES), the method 400 can proceed to 460.

At 460, the network manager can allocate bandwidth for a cyber-manager (e.g., the cyber-manager 140) to reconfigure the routers of the network infrastructure. At 470, the DoS attack can be thwarted by reconfiguring the routers to block the DoS attack. After 470, in some examples, the method 400 can end. In other examples (not shown), the method 400 can return to 410.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general-purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
   a recurrent neural network operating on one or more computing devices that generates a model that outputs a predicted network traffic for a network infrastructure for a time period in the future based on a sample of network traffic of the network infrastructure, wherein the predicted network traffic characterizes a predicted traffic volume and a predicted packet protocol and a percentage of distribution for each predicted packet protocol in the network infrastructure; and
   a network manager operating on one or more computing devices that commands a network router logically coupled to a point of ingress of the network infrastructure to adjust bandwidth limits controlled by the network router based on the predicted network traffic of the network infrastructure, wherein the network manager determines that a denial of service (DoS) attack is likely in response to packets of a particular protocol in actual network traffic exceeding a predicted percentage of distribution of the predicted network traffic for the particular protocol of packet by a threshold amount, and the network manager commands the router to allocate a predetermined amount of network bandwidth to a cyber-manager in response to the prediction of the DoS attack.

2. The system of claim 1, wherein the network manager commands the network router to increase bandwidth to a set of nodes of the network infrastructure for a given time period based on the predicted network traffic for the predetermined time period predicting a surge in network traffic during the given time period.

3. The system of claim 2, wherein the network manager increases bandwidth between nodes of the network associated with a geographic region and the set of nodes of the network infrastructure.

4. The system of claim 1, wherein the RNN selects a sliding window for the model to generate the predicted network traffic.

5. The system of claim 1, wherein the network manager monitors actual network traffic of the network infrastructure and compares actual network traffic to the predicted network traffic.

6. The system of claim 1, wherein the predicted traffic volume includes a rate of bytes that varies as a function of time and a rate of packets that varies as a function of time.

7. The system of claim 1, wherein the RNN executes a time series prediction to generate the predicted network traffic.

8. The system of claim 1, wherein the RNN comprises Long Short-Term Memory (LSTM) units.

9. The system of claim 1, wherein the RNN comprises Gated Recurrent Units (GRUs).

10. The system of claim 9, wherein each of the GRUs has an output that varies based on an update gate and a candidate activation, and the candidate activation is based on a reset gate that controls an extent to which a respective GRU remembers a previous state.

11. The system of claim 1, wherein the sample data includes non-linearities and the predicted network traffic accounts for the non-linearities included in the sample data.

12. A non-transitory machine-readable medium having machine readable instructions comprising:
a recurrent neural network (RNN) that:
generates a model based on sample data corresponding to captured network traffic of a network infrastructure for a time period in the future, and the model outputs a predicted network traffic for the network infrastructure, wherein the predicted network traffic characterizes a predicted traffic volume and a predicted packet protocol and a percentage of distribution for each predicted packet protocol in the network infrastructure; and
provides the predicted network traffic to a network manager operating on one or more computing devices, wherein the network manager commands a network router logically coupled to a point of ingress of the network infrastructure to adjust bandwidth limits controlled by the network router based on the predicted network traffic of the network infrastructure, wherein the network manager determines that a denial of service (DoS) attack is likely in response to a particular packet protocol of actual network traffic exceeding the predicted percentage of distribution for the particular packet protocol by a threshold amount, and the network manager commands the router to allocate a predetermined amount of network bandwidth to a cyber-manager in response to the prediction of the DoS attack.

13. The medium of claim 12, wherein the network manager commands the network router to increase bandwidth to a set of nodes of the network infrastructure for a given time period based on the predicted network traffic for the given time period predicting a surge in network traffic.

14. The medium of claim 12, wherein the network manager monitors network traffic of the network infrastructure and compares the actual network traffic to the predicted network traffic.

15. The medium of claim 12, wherein the sample data includes non-linearities and the predicted network traffic accounts for the non-linearities included in the sample data.

16. The medium of claim 12, wherein the RNN comprises Long Short-Term Memory (LSTM) units.

17. The medium of claim 12, wherein the RNN comprises Gated Recurrent Units (GRUs).

18. The medium of claim 17, wherein each of the GRUs has an output that varies based on an update gate and a candidate activation, and the candidate activation is based on a reset gate that controls an extent to which a respective GRU remembers a previous state.

19. A method for controlling operations of a network comprising:
capturing, by a packet sniffer, network traffic flowing in a network infrastructure to generate sample data that includes non-linearities;
generating, by a recurrent neural network (RNN), predicted network traffic for a time period in the future based on the sample data, wherein predicted network traffic characterizes a predicted traffic volume and a predicted packet protocol and a percentage of distribution for each predicted packet protocol in the network infrastructure and the predicted network traffic accounts for the non-linearities included in the sample data;
providing the predicted network traffic to a network manager;
comparing, by the network manager, a predicted packet protocol and distribution in the predicted network traffic to an actual packet type distribution;
identifying a likely denial of service (DoS) attack on the network infrastructure in response to packets of a particular protocol in actual network traffic exceeding a predicted percentage of distribution of the predicted network traffic for the particular protocol of packet by a threshold amount; and
allocating bandwidth to a cyber-manager to reconfigure a router of the network infrastructure in response to the identifying.

20. The method of claim 19, further comprising:
analyzing, by the network manager, predicted traffic volume in the predicted network traffic to identify a predicted surge in network traffic in the network infrastructure; and
reconfiguring a router of the network infrastructure in response to predicted surge in network traffic.

* * * * *